Figure 1:
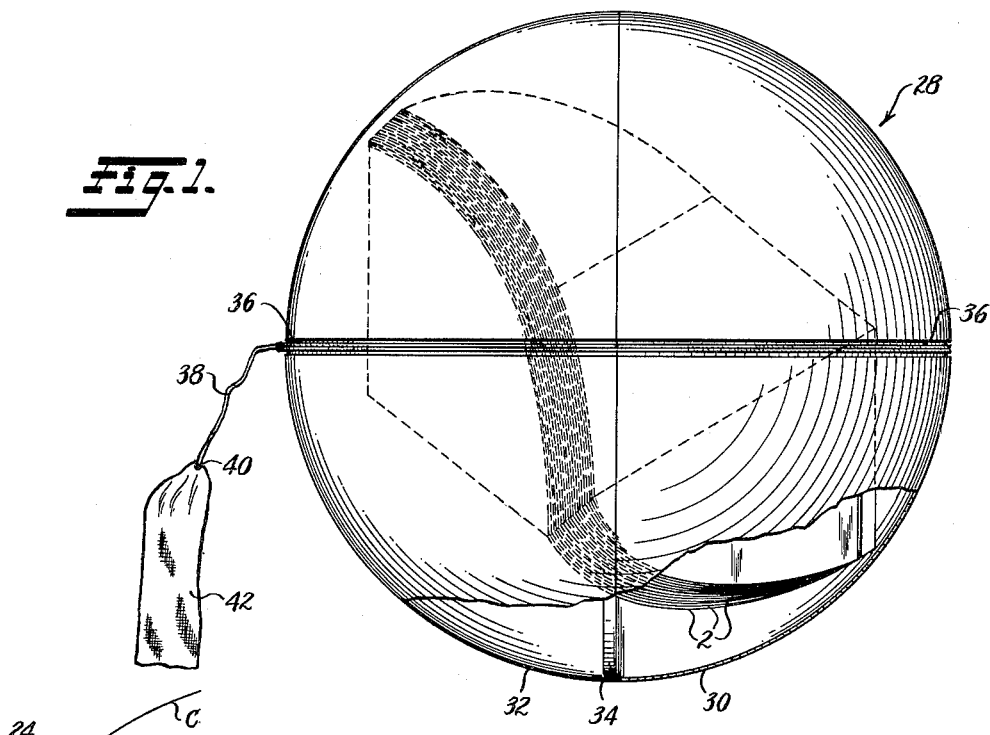

June 23, 1964  M. H. GREENWOOD  3,138,798
OPPOSED CORNER RADAR REFLECTOR ASSEMBLY
Filed July 18, 1957

INVENTOR.
Marvin H. Greenwood
BY
Bacon & Thomas
ATTORNEYS

United States Patent Office 3,138,798
Patented June 23, 1964

3,138,798
OPPOSED CORNER RADAR REFLECTOR ASSEMBLY
Marvin H. Greenwood, Houston, Tex., assignor to Anderson, Greenwood & Company, Houston, Tex., a corporation of Texas
Filed July 18, 1957, Ser. No. 672,773
8 Claims. (Cl. 343—18)

This invention relates to radar reflecting devices, and particularly to such devices known as "corner" reflectors.

With the advent of radar systems used for the detection of attacking aircraft, control and direction of manned interceptors, and in guidance systems for target-seeking type missiles, there arose the necessity for means capable of jamming or confusing these systems. The system of the present invention may be used by single airplanes to attract homing-type missiles and/or to confuse the enemy by presenting many more apparent targets on the radar-scope than the one caused by the airplane itself.

The present invention resides in the provision of a novel corner-type radar reflector unit whereby a multiplicity of the units may be stacked in intimately nested relationship and, when released, will separate and function to reflect a substantial amount of radar energy. The invention consists generally of a corner-type reflector wherein two "corners" are fixedly associated and are directed in opposite directions. The arrangement is such that the reflector, when falling through air, rotates about a horizontal axis and slowly gyrates about a vertical axis to thus alternately "aim" the reflectors at the radiant energy in sequential order. Although corner reflectors are highly directional, some signal is reflected even though the beam is off the principal axis. Thus a return signal of varying intensity is reflected continuously by the reflector pair as it flutters to the ground. The reflectors are so designed that a great number of them can be stacked in intimately nested relation and define a group of generally spherical outer configuration whereby the stacked plurality may be housed in a readily separable spherical casing for release from an aircraft or the like. Due to the small mass and high rate of spin of the devices, the reflectors fall to the ground quite slowly and are effective for an appreciable period of time.

The term "corner" reflector, as used herein, is well known in the art and describes a reflector structure consisting primarily of three right-angularly related plane surfaces arranged to define, in effect, one inside corner of a rectangular box.

It is therefore an object of this invention to provide a novel corner reflector having self-rotating characteristics when falling through air.

Another object of the invention is to provide a novel corner reflector designed to descend in air very slowly.

Still another object of the invention is to provide a corner reflector of the type set forth capable of nesting intimately with similar reflectors whereby a great number may be carried and released without occupying a great deal of space in the releasing aircraft.

A further object of the invention is to provide a novel assembly comprising a multiplicity of nested reflectors in a readily releasable casing.

An additional object of the invention is to provide a device as set forth above that is extremely simple in construction, economical to produce, and reliable in operation.

Figure 2:
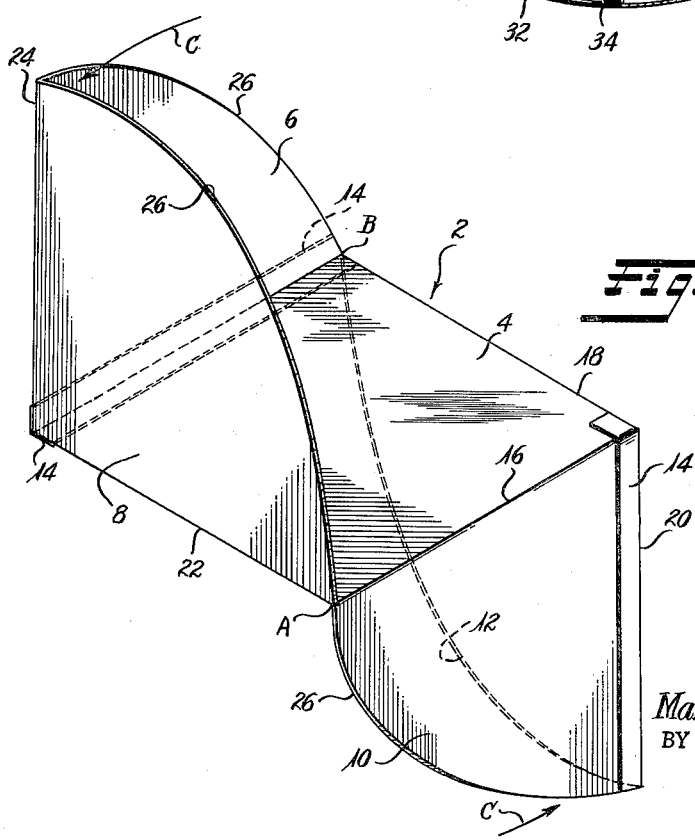

Additional and further objects and advantages will become apparent to those skilled in the art as the description proceeds with reference to the accompanying drawings, wherein:

FIG. 1 is a side view of a casing containing a group of nested reflectors embodying the present invention, with a portion of the casing broken away; and FIG. 2 is a perspective view of a single reflector embodying the present invention.

Referring first to FIG. 2, the reflector 2 shown therein comprises a first panel 4 of substantially square outline, the adjacent edges of which constitute peripheral boundary portions. Right-angularly related panels 6 and 8 are each shaped as a ninety degree sector of a circle with their straight edges respectively secured to adjacent edges of the panel 4 and to the corresponding straight edge of the other panel of the pair 6–8. The panels 6 and 8 extend perpendicular from only one face of the panel 4 to define an inside "corner." A further pair of panels 10 and 12 is secured to the first panel 4 at the opposite side edges or peripheral boundary portion thereof and extend perpendicular to the other face of the panel 4 to define a second inside "corner." It is to be noted that the corner reflectors defined by the panels 6, 8 and 4 on the one hand and panels 10, 12 and 4 on the other hand face in respectively opposite directions.

The panels described may be formed of any suitable radar-reflective material but it is preferred to use a light gauge aluminum foil of approximately .0055 inch thickness. The structure may be formed from a single sheet of foil suitably cut and folded and joined edges thereof may be held in the desired position by means of a suitable adhesive tape or the like 14. Obviously the blank of foil from which the reflector is formed may be cut to other shapes than those apparent from the structure shown in FIG. 2. As shown in FIG. 2, panels 10 and 12 are integral with and foldably joined to the panel 4 along edges 16 and 18, respectively. When folded to the position illustrated the adjacent edges of the panels 10 and 12 are secured together by means of tape 14 to define an edge 20 of the reflector. Panel 8 is integral with panel 4 and foldably joined thereto along a fold edge 22, whereas panel 6 is integral with and foldably joined to panel 8 along fold edge 24. The free edge of panel 6 is secured to an edge of panel 4 by means of the tape 14, shown. The described form of blank is merely illustrative and may be varied without departing from the invention.

It has been found that a reflector constructed in accordance with FIG. 2, when released from aircraft or the like, spins quite rapidly about a horizontal axis defined by the diagonal of the panel 4 and extending from corner A to corner B and that the axis remains substantially horizontal. The direction of rotation is as indicated by the arrows C. At the same time the structure, including the axis described above, slowly rotates about a vertical axis generally perpendicular to the panel 4 at about the center thereof. Rotation about the described vertical axis is due to the fact that the structure is not absolutely perfectly symmetrical about all axes and a small net lateral thrust is caused by the air through the device falls. The lack of perfect symmetry is due in part to the tapes 14 and the fact that the sheet material used is very thin and quite easily flexed by air currents and handling. Thus the reflector is autogyratory and rotates in such manner that its reflective "corners" are alternately and cyclically pointed toward any given source of radiation. When a large number of such reflectors are falling as a group, the reflected energy causes a strong target representation on the radar receiver scope.

It is further obvious that the reflectors 2 constructed in the manner described may be intimately nested with similar reflectors. FIG. 1 shows an assembly comprising a multiplicity of reflectors 2 nested in the manner described. It will be further obvious that the arcuate edges 26 of the panels 6, 8, 10 and 12 lie generally in the surface of a sphere. Thus, the nested stack of reflectors shown in FIG. 1 are quite snugly housed in a spherical casing 28. The casing 28 comprises hemispherical sections 30 and 32, of any suitable lightweight material, provided with suitable aligning flanges 34 or the like but loosely fitting together so as to be readily separable. As shown, the sections 30 and 32 are provided with complementary grooves or indentations 36 defining a circumferential groove extending around the assembly. A cord 38 is loosely wrapped around the sections 30 and 32, in groove 36, several times and its free end 40 left dangling therefrom without being secured to the other end of the cord or to the casing. A suitable banner 42 or other "drag" device is attached to the free end 40 of cord 38. When the assembly of FIG. 1 is ejected from an airplane, the banner 42 tends to drag behind and exert tension on the cord 38. The drag of the banner 42 causes the casing 28 to rotate in a direction to unwind the cord 38 and release the casing sections 30 and 32 from each other, whereupon they fly apart and release the stack of reflectors 2. When released in the air stream the reflectors 2 separate from each other, start to rotate in the manner previously described, and descend slowly as a fairly closely knit group. The above operation of the reflector device described does not commence immediately upon release of the container and its separation, since both the container and the reflectors therein have a substantially high forward velocity. However, once the container is opened and the reflectors are ejected and separated from each other by the air stream, they rapidly lose their forward velocity because of the high air resistance and their light weight. They very rapidly start to descend only vertically and begin to rotate in the manner described, while falling substantially vertically thereafter.

Approximately 100 of the reflectors 2, each comprising panels 4 of approximately six inches in side dimension, can be stacked and housed in a spherical casing of fourteen inches inside diameter. In a test, 60 reflectors were released from an aircraft at an altitude of 5,000 feet and remained airborne for approximately ten minutes. The horizontal distance to the radar site was approximately twenty-five miles. The radar systems "s" band was employed. The pattern on the radarscope was approximately one to one and one-half times that of the airplane and the two distinct patterns, from the airplane and from the group of reflectors, were continuous for approximately ten minutes after which the reflectors' pattern slowly faded.

While a single specific embodiment of the invention has been shown and described herein, it is to be understood that the same is merely illustrative of the invention. It is contemplated that the invention encompass other modifications falling within the scope of the appended claims.

I claim:

1. A radar reflective corner device, comprising; a flat and substantially square supporting panel, a first pair of right-angularly related panels extending perpendicular to one face of said supporting panel from adjacent side edges thereof, and a second pair of right-angularly related panels extending perpendicular to the other face of said supporting panel from the other side edges thereof.

2. A device as defined in claim 1 wherein the panels of each of said pairs is of a width equal to the length of a side of said supporting panel and of a height of the same order of magnitude.

3. A device as defined in claim 1 wherein each of the panels of said pairs is in the shape of a ninety degree sector of a circle, the straight sides thereof being of the same length as an edge of said supporting panel and being respectively joined to an edge of said supporting panel and the other panel of the pair.

4. A device as defined in claim 3 wherein all of said panels are formed of metal foil.

5. A droppable radar reflective assembly, comprising; a stack of a multiplicity of radar reflective corner devices in intimately nested relation, readily separable housing sections enclosing said stack, a flexible filament wrapped around said sections and frictionally holding them in stack-enclosing relation, an end of said filament dangling free of said sections and having suspended thereon a device offering substantial resistance to movement through air.

6. An assembly as defined in claim 5 wherein said radar reflective corner devices each comprises oppositely facing reflective corner structures having a common planar portion and arcuate boundary edges, said housing sections comprising a pair of hemispherical shells.

7. A radar reflective corner device, comprising: a substantially flat supporting panel having opposed flat faces and a peripheral boundary edge, a first pair of angularly related panels secured to said supporting panel and extending from one face along one peripheral boundary edge portion thereof to define a first reflective corner, a second pair of angularly related panels secured to said supporting panel and extending from the other face along the opposite peripheral boundary edge portion thereof to define a second reflective corner, said reflective corners facing in respectively opposite directions.

8. A radar reflecting corner device, comprising a free body consisting of a sheet metal structure formed to define a single pair of oppositely facing inside trihedral corners, said inside corners being formed on respectively opposite faces of said sheet metal and having a common planar sheet metal portion, the apex of said corners being spaced apart a substantial distance along the plane of said sheet metal portion.

References Cited in the file of this patent

UNITED STATES PATENTS

| | | |
|---|---|---|
| 662,701 | Smith | Nov. 27, 1900 |
| 700,166 | Bowers | May 20, 1902 |
| 2,452,822 | Wolf | Nov. 2, 1948 |
| 2,463,517 | Chromak | Mar. 8, 1949 |
| 2,697,828 | Heintz | Dec. 21, 1954 |
| 2,721,998 | Holm | Oct. 25, 1955 |
| 2,746,035 | Norwood | May 15, 1956 |
| 2,793,362 | Oberg | May 21, 1957 |

FOREIGN PATENTS

| | | |
|---|---|---|
| 1,048,270 | France | Aug. 5, 1953 |
| 564,757 | Canada | Oct. 14, 1958 |